US012134992B2

(12) United States Patent
Treffon et al.

(10) Patent No.: US 12,134,992 B2
(45) Date of Patent: Nov. 5, 2024

(54) METHOD AND PROCESSING DEVICE FOR OPERATING A CONTROL UNIT FOR AN EXHAUST GAS PROBE

(71) Applicant: Robert Bosch GmbH, Stuttgart (DE)

(72) Inventors: Thorsten Treffon, Stuttgart (DE); Tobias-Gerhard Zobel, Stuttgart (DE); Bernhard Ledermann, Weil der Stadt (DE); Florian Mezger, Stuttgart (DE); Axel Aue, Korntal-Muenchingen (DE); Andreas Kneer, Koengen (DE); Yannick Chauvet, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/637,852

(22) PCT Filed: Jul. 23, 2020

(86) PCT No.: PCT/EP2020/070760
§ 371 (c)(1),
(2) Date: Feb. 24, 2022

(87) PCT Pub. No.: WO2021/043500
PCT Pub. Date: Mar. 11, 2021

(65) Prior Publication Data

US 2022/0290626 A1 Sep. 15, 2022

(30) Foreign Application Priority Data

Sep. 4, 2019 (DE) ..................... 10 2019 213 411.4

(51) Int. Cl.
*F02D 41/14* (2006.01)
*F02D 41/28* (2006.01)

(52) U.S. Cl.
CPC ......... *F02D 41/1454* (2013.01); *F02D 41/28* (2013.01); *F02D 2041/281* (2013.01); *F02D 2041/286* (2013.01)

(58) Field of Classification Search
CPC ...... F02D 41/14; F02D 41/1454; F02D 41/28; F02D 2041/281; F02D 2041/286
See application file for complete search history.

(56) References Cited

U.S. PATENT DOCUMENTS 4,244,340 A * 1/1981 Herth .................. F02D 41/1476 123/695
6,371,097 B1 * 4/2002 Rossi .................. F02D 41/1456 123/697

(Continued)

FOREIGN PATENT DOCUMENTS

CN 103597505 A 2/2014
CN 104053890 A 9/2014

(Continued)

OTHER PUBLICATIONS

International Search Report for PCT/EP2020/070760, Issued Oct. 20, 2020.

(Continued)

*Primary Examiner* — Logan M Kraft
*Assistant Examiner* — Johnny H Hoang
(74) *Attorney, Agent, or Firm* — NORTON ROSE FULBRIGHT US LLP; Gerard A. Messina

(57) ABSTRACT

A method for operating a control unit for an exhaust gas probe, in particular a broadband Lambda probe for an internal combustion engine, in particular of a motor vehicle. The control unit is designed for the electrical actuation of the exhaust gas probe, and the control unit in particular being implemented in the form of an application-specific integrated circuit, ASIC. The method includes: specifying control data for an operation of the control unit and/or the (Continued)

exhaust gas probe with the aid of a processing device; receiving operating data which characterizes the operation of the control unit and/or the exhaust gas probe with the aid of a processing device.

9 Claims, 3 Drawing Sheets

(56) References Cited

U.S. PATENT DOCUMENTS

| | | | | |
|---|---|---|---|---|
| 7,899,606 | B2 * | 3/2011 | Bartick | F02D 41/1475 123/688 |
| 8,393,316 | B2 * | 3/2013 | Kunihiro | F02D 41/1495 73/23.32 |
| 8,887,495 | B2 * | 11/2014 | Ren | B01D 46/64 60/297 |
| 11,326,529 | B1 * | 5/2022 | Dudar | B60W 30/18009 |
| 2011/0011067 | A1 * | 1/2011 | Ren | F01N 3/2828 60/297 |
| 2014/0287519 | A1 * | 9/2014 | Kunz | G01N 25/32 436/160 |
| 2016/0201588 | A1 * | 7/2016 | Bevot | F02D 41/28 73/114.73 |
| 2018/0112606 | A1 * | 4/2018 | Huang | F02D 19/105 |

FOREIGN PATENT DOCUMENTS

| | | | |
|---|---|---|---|
| CN | 104428506 | A | 3/2015 |
| DE | 102010039872 | A1 | 3/2012 |
| DE | 102013216223 | A1 | 2/2015 |
| FR | 2914692 | A1 | 10/2008 |
| JP | 2000146909 | A | 5/2000 |

OTHER PUBLICATIONS

Anonymous, "L9780—Wide Range Air Fuel Sensor Control Interface," St Life.Augmented, 2014, pp. 1-56. <https://www.st.com/resource/en/datasheet/19780.Pdf>.

Knödler, "Lambda-Messwandler Version 4.X," Sebastian Knödler Technologie, 2015, pp. 1-53. <http://breitband-lambda.de/files/Doku%20V4.0%20(Stand%2028.12.2015).pdf>.

Anonymous, "Automotive Electronics Product Information Lambda Probe Interface IC-CJ125," Bosch, 2006, pp. 1-7. <https://www.tme.eu/Document/e2f24a4716c4c2eb5720723a8c3c1390/CJ125.pdf> Downloaded Feb. 23, 2022.

* cited by examiner

METHOD AND PROCESSING DEVICE FOR OPERATING A CONTROL UNIT FOR AN EXHAUST GAS PROBE

FIELD

The present invention relates to a method for operating a control unit for an exhaust gas probe, in particular a broadband Lambda probe.

In addition, the present invention relates to a processing device for carrying out such a method.

SUMMARY

Preferred embodiments of the present invention relate to a method for operating a control unit for an exhaust gas probe, in particular a broadband Lambda probe for an internal combustion engine, in particular of a motor vehicle, the control unit being developed for the electrical actuation of the exhaust gas probe, and the control unit in particular being implemented in the form of an application-specific integrated circuit, ASIC. In accordance with an example embodiment of the present invention, the method includes: specifying control data for an operation of the control unit and/or the exhaust gas probe with the aid of a processing device; receiving operating data characterizing the operation of the control unit and/or the exhaust gas probe with the aid of the processing device. This provides greater flexibility compared to conventional systems which, for example, provide only an ASIC for the operation of the exhaust gas probe, insofar as the processing device is able to execute different computer programs, for example, and/or—in contrast to the conventional ASIC—can be (re-) programmed in an efficient manner in order to modify the operation of the exhaust gas probe. For example, if the exhaust gas probe is to be operated on the basis of new control data, a corresponding computer program for the processing device which, for instance, generates the control data is able to be modified so that the control unit is supplied with the modified control data for the operation of the exhaust gas probe. In an advantageous manner, no modification of the control unit itself is required, which entails a relatively high outlay in conventional systems (e.g., a mask change for the ASIC, a new chip pattern) if an embodiment as an ASIC is involved.

In further preferred embodiments of the present invention, the processing device has at least one processing unit for executing at least one computer program, which particularly is designed to control an operation of the control unit and/or the exhaust gas probe and/or to generate the control data and/or to receive the operating data at least intermittently.

In further preferred embodiments of the present invention, it is provided that the processing device at least partially realizes a sequence control for an operation of the exhaust gas probe, the sequence control in particular being at least partially predefined with the aid of at least one computer program or the at least one computer program. As a result, at least those parts of the sequence control that are realized with the aid of software, i.e., the mentioned computer program, for instance, are relatively easy to modify in comparison with a modification of an existing ASIC.

In further preferred embodiments of the present invention, it is provided that the processing device at least partially realizes a primary sequence control for an operation of the exhaust gas probe, a secondary sequence control of the control unit particularly being controlled by the primary sequence control. This advantageously makes it possible to distribute the sequence control to the processing device and the control unit, in which case, for instance, those parts of the sequence control for the operation of the exhaust gas probe that are to be easily modifiable are implemented with the aid of the processing unit, e.g., in the form of a computer program, and, for instance, and those parts of the sequence control for an operation of the exhaust gas probe that have special timing requirements and are to be changed relatively rarely are implemented with the aid of the control unit, which is developed as an ASIC, for example.

In further preferred embodiments of the present invention, the sequence control for the operation of the exhaust gas probe may also be referred to as a ‘sequencer’, and according to further preferred embodiments, a high-level sequencer, e.g., in the form of the primary sequence control described above by way of example is realized with the aid of the processing device, and according to further preferred embodiments, a low-level sequencer, e.g., in the form of the sequence control described above by way of example is realized with the aid of the control unit, e.g., in the form of an ASIC.

In further preferred embodiments of the present invention, it is provided that the sequence control and/or the primary sequence control at least intermittently control(s) at least one of the following sequences: a) establishing time intervals of measurements; b) transmitting setpoint values for switch settings to the control unit; c) transmitting measured values, in particular ascertainable with the aid of the control unit, to the processing device; d) identifying and/or plausibilizing measured values received from the control unit, in particular in comparison with an expected measured value; e) retrieving status information, especially error information, of the control unit; f) actuating (triggering) a pump current controller of the control unit, in particular after receiving a new measured value of a Nernst voltage; g) setting switches of the control unit, in particular in such a way that no short circuits and/or current interruptions occur; h) starting measurements with the aid of an/the analog-to-digital converter, in particular synchronously with a reference signal or reference clock; i) resetting (setting back) an input filter of an/the analog-digital converter; j) transferring data, in particular from the control unit to the processing device and/or in reverse, in particular via a serial data interface; k) generating an item of operating information which particularly signals the conclusion of a measurement; l) generating error information.

In further preferred embodiments of the present invention, it is provided that especially the aforementioned sequences a) through f) are able to be executed with the aid of the primary sequence control (high-level sequencer), and especially the aforementioned sequences g) through l) are able to be executed with the aid of the secondary sequence control (low-level sequencer).

Further preferred embodiments of the present invention relate to a processing device for carrying out the method(s) according to the embodiments.

In further preferred embodiments of the present invention, it is provided that the processing device has at least one processing unit and at least one memory unit, which is allocated to the processing unit and provided for the at least intermittent storage of a computer program and/or data (e.g., data for a sequence control of the operation of the exhaust gas probe), the computer program especially being designed to carry out one or more steps of the method(s) according to the embodiments.

In further preferred embodiments of the present invention, the processing unit has at least one of the following elements: a microprocessor, a microcontroller, a digital signal processor (DSP), a programmable logic component (e.g., FPGA, field programmable gate array), at least one processor core. In further preferred embodiments, combinations thereof are also possible.

In further preferred embodiments of the present invention, the memory unit has at least one of the following elements: a volatile memory, in particular a working memory (RAM), a non-volatile memory, in particular a flash EEPROM.

Further preferred embodiments of the present invention relate to a computer program (product) which includes instructions that when the computer program is executed by a computer, e.g., the above-mentioned processing unit, induces the computer to carry out the method(s) according to the embodiments.

Additional preferred embodiments of the present invention relate to a computer-readable memory medium which includes instructions, in particular in the form of a computer program, which when executed by a computer, induce the computer to carry out the method(s) according to the embodiments.

Further preferred embodiments of the present invention relate to a data carrier signal which characterizes and/or transmits the computer program according to the embodiments. For example, the processing device may have an optional, preferably bidirectional, data interface for receiving the data carrier signal. In further preferred embodiments, the processing device is also able to receive input signals usable for its operation from the exhaust gas probe and/or the control unit, for example with the aid of the optional data interface, and/or to output output signals, e.g., control data for an operation of the exhaust gas probe and/or the control unit, to the control unit and/or the exhaust gas probe.

In further preferred embodiments of the present invention, it is provided that the processing device has an analog-to-digital converter, ADC and at least intermittently digitizes at least one analog signal of the exhaust gas probe and/or an analog signal derived from the analog signal of the exhaust gas probe with the aid of the control unit. In further preferred embodiments, the ADC may also be part of the data interface, for example.

Further preferred embodiments of the present invention relate to a control unit for an exhaust gas probe, in particular a broadband Lambda probe for an internal combustion engine, especially of a motor vehicle, the control unit being developed for the electrical actuation of the exhaust gas probe, and the control unit especially being implemented in the form of an application-specific integrated circuit, ASIC, the control unit being developed to carry out the following steps: receiving from a processing device control data for an operation of the control unit and/or the exhaust gas probe, the processing device in particular being developed according to the embodiments; and transmitting operating data that characterizes the operation of the control unit and/or the exhaust gas probe to the processing device.

In further preferred embodiments of the present invention, it is provided that the control unit at least partially realizes a sequence control for an operation of the exhaust gas probe, and the sequence control of the control unit at least intermittently controls at least one of the following sequences: G) setting switches of the control unit, in particular in such a way that no short circuits and/or current interruptions occur; H) starting measurements with the aid of an analog-to-digital converter, preferably integrated into the control unit, in particular synchronously with a reference signal or reference clock; I) resetting an input filter of a/the analog-to-digital converter; J) transferring data, in particular from the control unit to the processing device and/or in reverse, in particular via a serial data interface; K) generating an item of operating information which particularly signals the conclusion of a measurement; L) generating error information.

Further features, application options and advantages of the present invention result from the following description of exemplary embodiments of the present invention, which are shown in the figures. All described or illustrated features form the subject matter of the present invention, by themselves or in any combination, regardless of their wording or representation in the specification and the figures.

DETAILED DESCRIPTION OF EXAMPLE EMBODIMENTS

Figure 1:
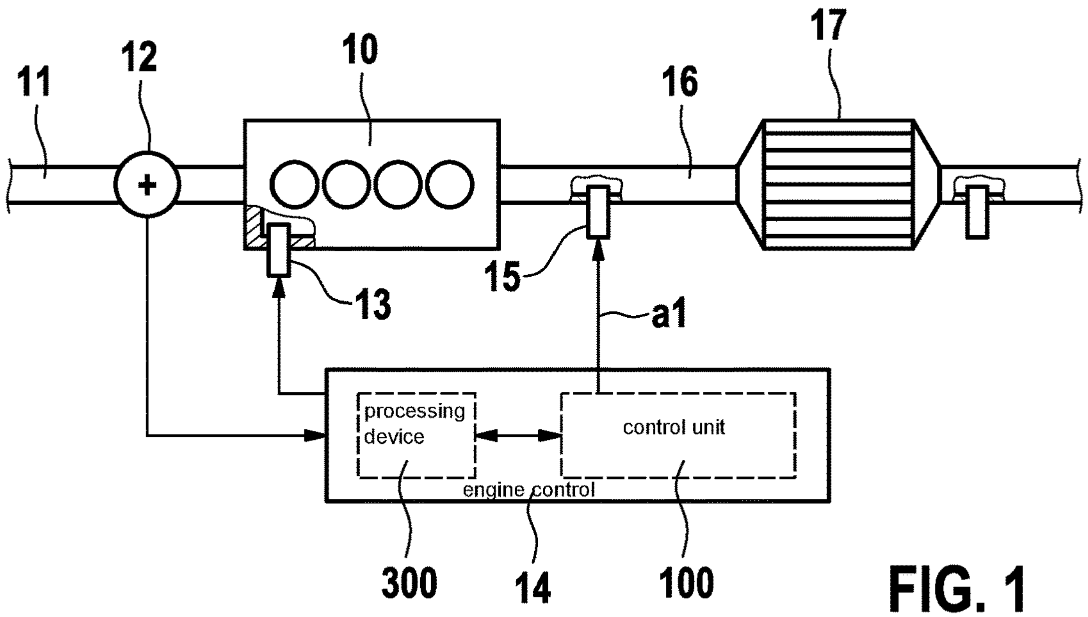
FIG. 1 shows schematically, a simplified block diagram of an internal combustion engine in which the method according to the preferred embodiments of the present invention is able to be used.

Using the example of an internal combustion engine, FIG. 1 schematically shows the technical environment in which the present method according to preferred embodiments is able to be used. Via an air supply 11, air is supplied to an internal combustion engine 10 and its mass is determined with the aid of an air mass sensor 12. Air mass sensor 12 may be embodied as a hot-film air mass sensor. The exhaust gas of internal combustion engine 10 is discharged via an exhaust duct 16, and an exhaust emission control system 17 is provided downstream from internal combustion engine 10 in the flow direction of the exhaust gas. For the control of internal combustion engine 10, an engine control 14 is provided, which on the one hand controls the amount of fuel conveyed to internal combustion engine 10 via a fuel metering device 13 and on the other hand receives the signals from air mass sensor 12 and from an exhaust gas probe 15 situated in exhaust gas duct 16, e.g., upstream from exhaust emission control system 17. Exhaust gas probe 15 determines an instantaneous Lambda value of a fuel-air mixture supplied to internal combustion engine 10 and, for instance, may form part of a Lambda control loop allocated to internal combustion engine 10. For example, exhaust gas probe 15 may be embodied as a broadband Lambda probe.

In preferred embodiments, a control unit 100 is provided for the operation of exhaust gas probe 15, which particularly is developed for the electrical actuation a1 of exhaust gas probe 15 or of components of exhaust gas probe 15. For instance, control unit 100 may be embodied in the form of an ASIC and be integrated into engine control 14, for example.

Figure 5A:
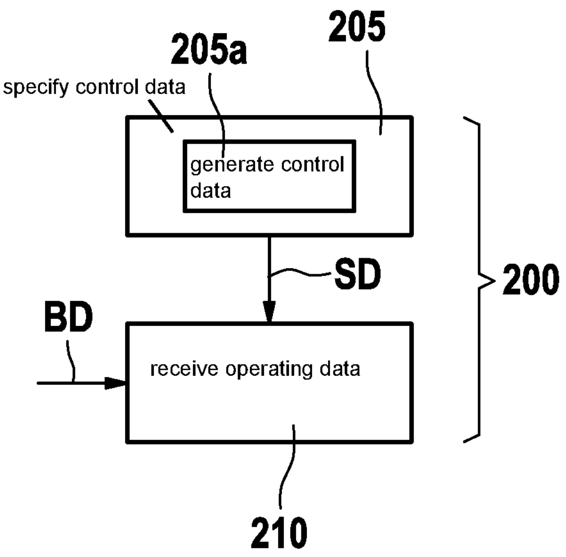
FIG. 5A shows schematically, a simplified flow diagram of a method according to further preferred embodiments of the present invention.

Preferred embodiments relate to a method for operating control unit 100 for exhaust gas probe 15, especially a broadband Lambda probe for an internal combustion engine, in particular of a motor vehicle, the method having the following steps, see the flow diagram from FIG. 5A: specifying 205 control data SD for an operation of control unit 100 and/or exhaust gas probe 15 with the aid of a processing device 300 (FIG. 1); receiving 210 (FIG. 5A) operating data BD that characterizing the operation of control unit 100 and/or exhaust gas probe 15 with the aid of processing device 300. Compared to conventional systems, which provide only an ASIC for the operation of exhaust gas probe 15, this provides greater flexibility, for instance because processing device 300 is able to execute different computer programs and/or is able to be (re-) programmed in order to modify the operation of exhaust gas probe 15 or control unit 100. For instance, if exhaust gas probe 15 is to be operated using new control data SD, a corresponding computer program for processing device 300 which, for instance generates control data SD, is then able to be modified so that control unit 100 is supplied with the modified control data SD for the operation of exhaust gas probe 15. In an advantageous manner, for example, no modification of control unit 100 itself is required, which entails a relatively high outlay (e.g., a mask change for the ASIC, a new chip pattern) if control unit 100 is embodied as an ASIC.

Through steps 205, 210 according to FIG. 5A, an efficient and flexible sequence control 200 for the operation of exhaust gas probe 15 and/or its control unit 100 is advantageously provided. In further preferred embodiments, the specification 205 of control data SD may include the generation 205*a* (FIG. 5A) of control data SD with the aid of processing device 300, e.g., using a computer program.

Figure 2:
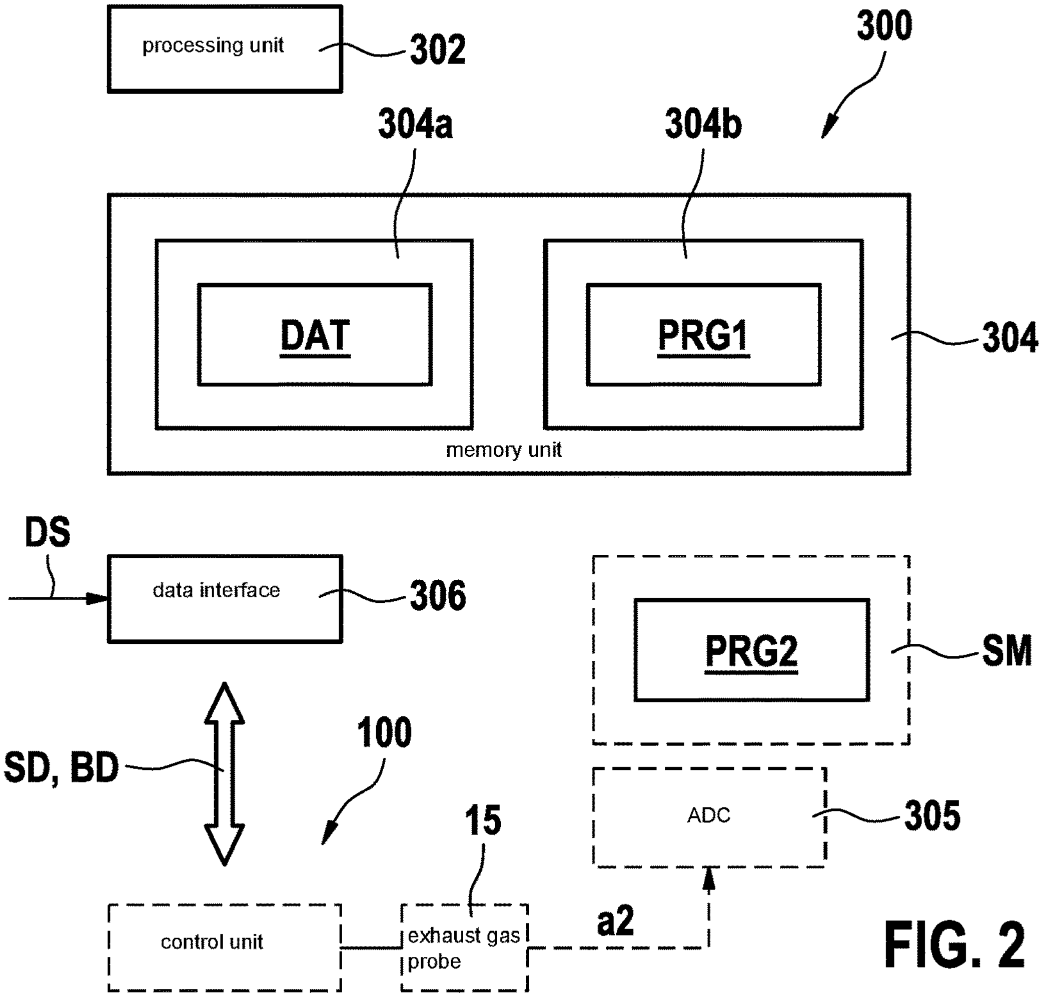
FIG. 2 shows schematically, a simplified block diagram of a processing device according to further preferred embodiments of the present invention.

In further preferred embodiments, see FIG. 2, processing device 300 has at least one processing unit 302 for executing at least one computer program PRG1, which particularly is developed to control an operation of control unit 100 (FIG. 1) and/or of exhaust gas probe 15 and/or to generate control data SD (see step 205*a* from FIG. 5A) and/or to receive 210 operating data BD at least intermittently.

In further preferred embodiments, it is provided that processing device 300 (FIG. 2) at least partially realizes a sequence control 200 (FIG. 5A) for an operation of exhaust gas probe 15, sequence control 200 especially being at least partially predefined with the aid of the at least one computer program PGR1 (FIG. 2). Thus, at least those parts of sequence control 200 that are realized with the aid of software, i.e., the mentioned computer program PRG1, for instance, are relatively easy to modify in comparison with a modification of an existing ASIC 100.

In further preferred embodiments, it is provided that processing device 300 has at least one processing unit 302, at least one memory unit 304 allocated to processing unit 302 for the at least intermittent storage of a/the computer program PRG1 and/or data DAT (e.g., data for the sequence control 200 of the operation of exhaust gas probe 15), computer program PRG1 being developed especially for the execution of one or more steps of the present method according to the embodiments.

In further preferred embodiments, processing unit 302 has at least one of the following elements: a microprocessor, a microcontroller, a digital signal processor (DSP), a programmable logic component (e.g., FPGA, field programmable gate array), at least one processor core. Combinations thereof are also possible in further preferred embodiments. Processing device 300 is preferably embodied in the form of a microcontroller having one or more processor cores 302, for example.

In further preferred embodiments, memory unit 304 has at least one of the following elements: a volatile memory 304*a*, in particular a working memory (RAM), and a non-volatile memory 304*b*, in particular a flash EEPROM.

Further preferred embodiments relate to a computer program (product) PRG1, which includes instructions that when computer program PGR is executed by a computer 302, induces it to carry out the method according to the embodiments.

Additional preferred embodiments relate to an optional computer-readable memory medium SM, which includes instructions, in particular in the form of a computer program PRG2, which when executed by a computer 302, induce the computer to execute the method according to the embodiments.

Additional preferred embodiments relate to a data carrier signal DS which characterizes and/or transmits computer program PRG1, PRG2 according to the embodiments. For example, processing device 300 may include an optional, preferably bidirectional, data interface 306 for receiving data carrier signal DS. In further preferred embodiments, processing device 300 is also able to receive input signals BD that, for example, are usable for its operation with the aid of optional data interface 306, e.g., from exhaust gas probe 15 and/or control unit 100, and/or to output output signals, e.g., control data SD for an operation of exhaust gas probe 15 and/or control unit 100, to control unit 100 and/or exhaust gas probe 15.

Figure 5B:
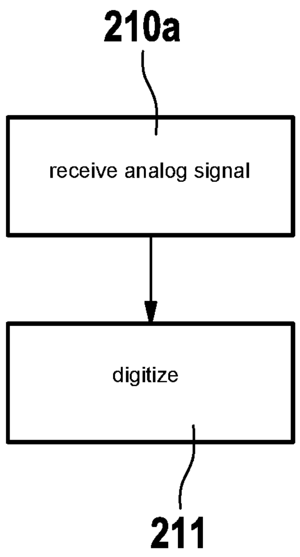
FIG. 5B shows schematically, a simplified flow diagram of a method according to further embodiments of the present invention.

In further preferred embodiments, processing device 300 has an analog-to-digital converter, ADC, 305 and at least intermittently digitizes at least one analog signal a2 of exhaust gas probe 15 and/or an analog signal a2 derived from analog signal a2 of exhaust gas probe 15 with the aid of control unit 100. In further preferred embodiments, for instance, ADC 305 may also be part of data interface 306. The receiving of analog signal a2 from exhaust gas probe 15 or control unit 100 is shown in step 210*a* of FIG. 5B by way of example, and the digitizing with the aid of ADC 305 (FIG. 2) is shown in step 211 of FIG. 5B. In further preferred embodiments, the digitized data obtained in this manner are able to be used for a sequence control 200, in particular also for a control of an operation of exhaust gas probe 15 or control unit 100, in particular by processing device 300.

Figure 3:
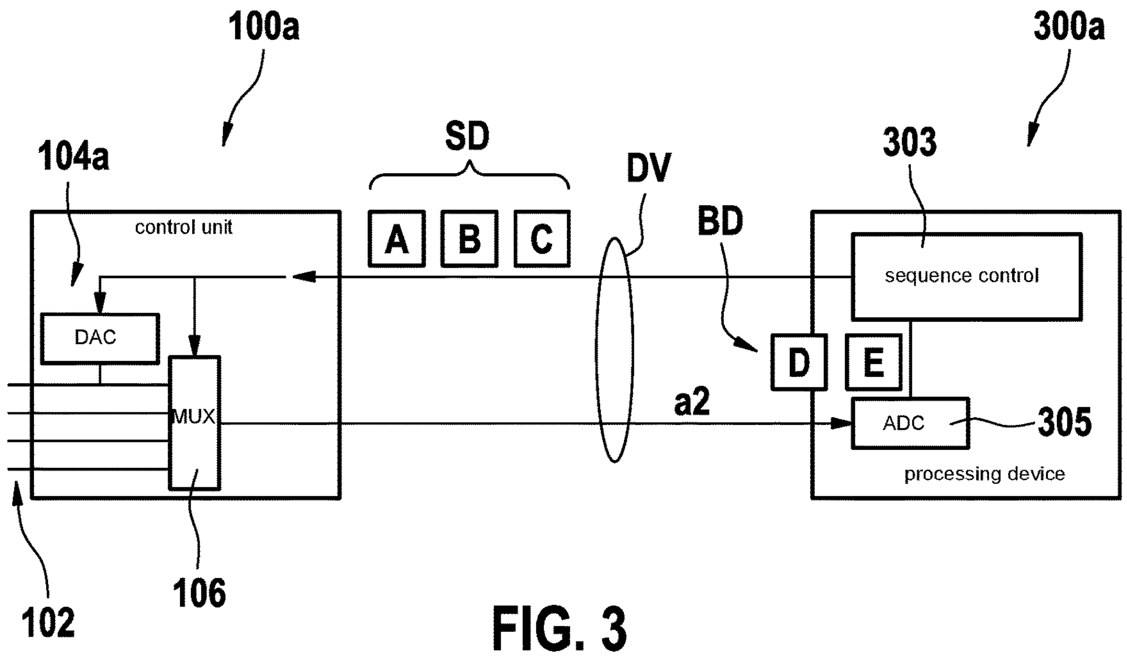
FIG. 3 shows schematically, a simplified block diagram according to further preferred embodiments of the present invention.

FIG. 3 schematically shows a simplified block diagram according to further preferred embodiments. In processing device 300*a*, which, for example, may have a configuration that is identical or similar to configuration 300 according to FIG. 2, a sequence control 303 is implemented, in particular a complete sequence control, for the operation of exhaust gas probe 15 with the aid of control unit 100*a*. For this purpose, sequence control 303 transmits control data A, B, C (similar to control data SD according to FIG. 5A) to control unit 100*a* via the preferably bidirectional data connection DV (see also element 306 according to FIG. 2). Control data A, B, C according to FIG. 3, for instance, include switch settings for controlling at least one multiplexer ("MUX") 106 included in control unit 100*a*, and energization information that characterizes a digital-to-analog converter (DAC) 104*a* provided in control unit 100*a*. Reference numeral 102 symbolizes an electrical connection of control unit 100*a* to exhaust gas probe 15 (FIG. 1). Exemplary details for electrical connection 102 of control unit 100*a* to exhaust gas probe 15 may be gathered from a data sheet of an actuation component of the type "CJ135" distributed by the applicant, for example.

Operating data BD ascertainable with the aid of control unit 100*a* are preferably transmitted from control unit 100*a* via data connection DV to processing device 300*a*. For instance, operating data BD may include analog measured values D, E, see also reference numeral a2 (see also FIG. 2).

In the configuration described above by way of example with reference to FIG. 3, processing device 300*a* carries out a relatively large part of the sequence control required for operating exhaust gas probe 15, preferably under the control of the corresponding computer program PRG1 (FIG. 2).

More specifically, in further preferred embodiments, even the entire sequence control is able to be implemented via sequencer 303 of processing device 300*a*, which, for example, assumes tasks of a high-level sequencer and also a low-level sequencer. For instance, this variant may be used when processing device 300*a* has an ADC 305 so that ADC 305 is able to be actuated directly, in particular without a transmission between control unit 100*a* and processing device 300*a*, e.g., by processing unit 302 (FIG. 2) of processing device 300*a*. In a further advantageous manner, a switch structure 106 possibly provided in control unit 100*a* may be used for a switchover of the ADC inputs and, for example, be realized via MUX switch 106.

Different analog signals a2 of exhaust gas probe 15 are thereby able to be switched to an input of ADC 305, e.g., in a time multiplex operation. As a result, no short circuits can advantageously occur, in particular none that are caused by different opening and closing times of switches 106, as may be the case in conventional control units. In the configuration according to FIG. 3, the requirement of a local sequencer (sequence control), in particular a low-level sequencer, in control unit 100*a* may advantageously be omitted so that control unit 100*a* can have a less complex design.

Figure 4:
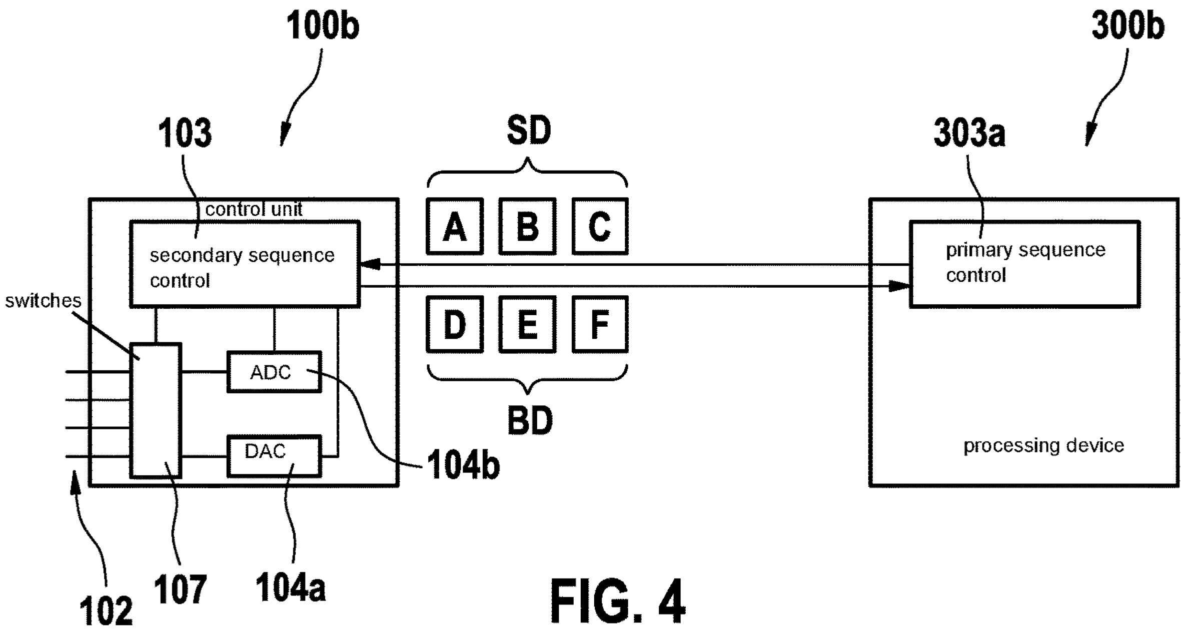
FIG. 4 shows schematically, a simplified block diagram according to further preferred embodiments of the present invention.

FIG. 4 schematically illustrates a simplified block diagram according to further preferred embodiments. In the configuration illustrated in FIG. 4, processing device 300*b* at least partially realizes a primary sequence control 303*a* for an operation of exhaust gas probe 15, a secondary sequence control 103, which is controlled with the aid of primary sequence control 303*a* of processing device 300*b*, in particular being provided in control unit 100*b*. In this way, the sequence control for the operation of exhaust gas probe 15 (FIG. 1) is advantageously able to be distributed to processing device 300*b* and control unit 100*b*, in which case, for instance, those parts of the sequence control for an operation of exhaust gas probe 15 that are to be easily modifiable are implemented with the aid of processing device 300*b*, e.g., in the form of computer program PRG1, PRG2 (FIG. 2), and, for example, those parts of the sequence control for an operation of exhaust gas probe 15 that have special timing requirements (e.g., signal sequences that change rapidly over time) and which are to be modified relatively rarely, are implemented with the aid of control unit 100*b*, which is developed as an ASIC, for instance.

In further preferred embodiments, as mentioned above, the sequence control for the operation of the exhaust gas probe may also be referred to as a sequencer, and according to further preferred embodiments, a high-level sequencer, e.g., in the form of the sequence control 303*a* described above by way of example, is realized with the aid of processing device 300*b*, and according to further preferred embodiments, a low-level sequencer, e.g., in the form of secondary sequence control 103 described above by way of example, is realized with the aid of control unit 100*b* (e.g., ASIC).

In further preferred embodiments, it is provided that sequence control 200 (FIG. 5A), 303 (FIG. 3), and/or primary sequence control 303*a* (FIG. 4) at least intermittently control(s) at least one of the following sequences: a) establishing time intervals of measurements; b) transmitting setpoint values for switch positions to the control unit; c) transmitting measured values, in particular ascertainable with the aid of the control unit, to the processing device; d) identifying and/or plausibilizing measured values received from the control unit, in particular in comparison with an expected measured value; e) retrieving status information, in particular error information, of the control unit; f) actuating (triggering) a pump current controller of the control unit, in particular after receiving a new measured value of a Nernst voltage; g) setting switches of the control unit, in particular in such a way that no short circuits and/or current interruptions occur; h) starting measurements with the aid of a/the analog-to-digital converter, in particular synchronously with a reference signal or reference clock; i) resetting (setting back) an input filter of an/the analog-to-digital converter; j) transferring data, in particular from the control unit to the processing device and/or reverse, in particular via a serial data interface; k) generating an item of operating information that particularly signals a conclusion of a measurement; l) generating error information.

In further preferred embodiments, it is provided that especially the above-mentioned sequences a) through f) are able to be executed with the aid of primary sequence control 303*a* (FIG. 4) (high-level sequencer), and that in particular the aforementioned sequences g) through l) are able to be executed with the aid of secondary sequence control 103 (low-level sequencer). By way of example, in further preferred embodiments, a definition of measurements is implementable via switch settings, timings and current sources within computer program PRG1 of processing device 300*b* in high-level sequencer 303*a*. A chronologically precise switching of switches 107, current sources and an actuation of ADC 104*b* for individual measurements, for instance, takes place within the low-level sequencer 103, which is situated in control unit 100*b* preferably developed as an ASIC.

In further preferred embodiments, it is provided that low-level sequencer 103 is synchronized with high-level sequencer 303*a* with the aid of a reference signal (e.g., transmittable via data connection DV, FIG. 3), which is able to be supplied by processing device 300*b* or its high-level sequencer 303*a*.

In further preferred embodiments, it is provided that high-level sequencer 303*a* is synchronized with a reference signal of processing device 300*b*, e.g., by a chip select ("CS") signal of processing device 300*b* or its processing unit 302.

In further preferred embodiments, see FIG. 3, for instance, sequencer 303 may at least intermittently also carry out many or all of the above-mentioned sequences a) through l).

In further preferred embodiments, control data SD according to FIG. 4 correspond to, for instance, measurements or control information for measurements to be carried out with the aid of ADC 104*b* of control unit 100*b*, including switch positions for switch structure 107 and energizations for DAC 104*a* of control unit 100*b*. In further preferred embodiments, for instance, the operating data BD according to FIG. 4 correspond to measured values D, E, and status information F. In further preferred embodiments, switch structure 107 may have multiple switches which are switchable independently of one another, for example.

Figure 6:
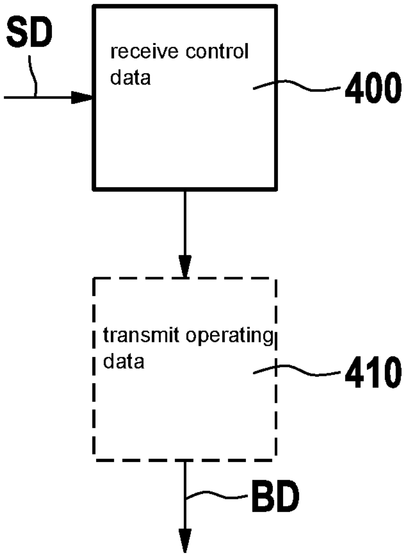
FIG. 6 shows schematically, a simplified flow diagram of a method according to further preferred embodiments of the present invention.

Additional preferred embodiments relate to a control unit 100, 100*a*, 100*b* for an exhaust gas probe 15, in particular a broadband Lambda probe for an internal combustion engine, in particular of a motor vehicle, and control unit 15 is developed for the electrical actuation a1 (FIG. 1) of exhaust gas probe 15, the control unit in particular being implemented in the form of an application-specific integrated circuit, ASIC, and the control unit being developed to execute the following steps, see FIG. 6: receiving (400) control data SD for operating control unit 100, 100*a*, 100*b* and/or exhaust gas probe 15 from a processing device 300, 300*a*, 300*b*, processing device 300, 300*a*, 300*b* in particular being developed according to the embodiments; transmitting 410 (FIG. 6) operating data BD that characterize the operation of the control unit and/or the exhaust gas probe to processing device 300, 300*a*, 300*b*.

In further preferred embodiments, see FIG. 4, for example, it is provided that control unit 100*b* at least partially realizes a sequence control 103 for an operation of exhaust gas probe 15, sequence control 103 (e.g., low-level sequencer) of control unit 100*b* at least intermittently controlling at least one of the following sequences: G) setting switches 107 of control unit 100*b*, in particular in such a way that no short circuits and/or current interruptions occur; H) starting measurements with the aid of an analog-to-digital converter 104*b* preferably integrated into control unit 100*b*, in particular synchronously with a reference signal or reference clock (which, for example, is predefinable via data connection DV (FIG. 3), by processing device 300*b* (FIG. 4)); I) resetting an input filter (not shown) of a/the analog-to-digital converter 104*b*; J) transferring data, in particular from control unit 100*b* to processing device 300*b* and/or in reverse, in particular via a serial data interface DV; K) generating an item of operating information BD which particularly signals the conclusion of a measurement; L) generating error information.

The principle according to preferred embodiments provides much greater flexibility compared to conventional approaches, in particular with regard to the definition of the measurement sequence. Sequence control 200, for instance, defines the setting of current sources, the switching of switches 107, and thus the operating sequence of the current sources and measurements. The principle according to the preferred embodiments makes it possible, for example, to flexibly adapt different measuring sequences and/or energizations to individual system requirements by a modification in software PRG1, PRG2, in particular without modifying control unit 100, 100*a*, 100*b* preferably developed as an ASIC. Additional advantages at least partially achievable by at least some preferred embodiments are: a) a freely programmable adaptation of sequence control 200 via a software modification (PRG1, PRG2) is possible; b) an actuation of the switches and current sources of the control unit in the sub-microsecond range for an efficient utilization of the sequence time and thus a high-frequency performance of the measurements is possible; c) resource savings in ASIC 100, 100*a*, 100*b*; d) no processing unit is required in ASIC 100, 100*a*, 100*b*, microcontroller resources (in particular of processing device 300) are utilized for calculations and/or for the triggering of the measurements; e) no memory is required in ASIC 100, 100*a*, 100*b* in a direct transmission of the measured values; f) a less complex overall structure of ASIC 100, 100*a*, 100*b* is possible; g) a lower transmission data quantity between ASIC 100*a* and processing device 300*a* (FIG. 3) if an ADC 305 is provided in processing device 300*a*.

What is claimed is:

1. A method for operating a control unit for an exhaust gas probe for an internal combustion engine, the control unit being configured to electrically actuate the exhaust gas probe, and the control unit being implemented as an application-specific integrated circuit (ASIC), the method comprising:

specifying control data for an operation of at least one of the control unit or the exhaust gas probe using a processing device; and receiving operating data characterizing the operation of at least one of the control unit or the exhaust gas probe using the processing device, wherein the processing device has an analog-to-digital converter and at least intermittently digitizes at least one analog signal of the exhaust gas probe or an analog signal derived from the analog signal of the exhaust gas probe, using the control unit, wherein the digitized signal is used for controlling the operation of the at least one of the control unit or the exhaust gas probe using the processing device, wherein the processing device has at least one processing unit configured to execute at least one computer program which is configured to at least one of control the operation of the at least one of control unit or the exhaust gas probe, or to generate the control data, or to receive the operating data at least intermittently, wherein the processing device at least partially realizes a sequence control for an operation of the exhaust gas probe, the sequence control being at least partially predefined using at least one computer program, wherein the sequence control control(s) all of the following sequences at least intermittently: a) establishing time intervals of measurements; b) transmitting setpoint values for switch settings to the control unit; c) transmitting measured values ascertainable using the control unit, to the processing device; d) at least one of identifying or plausibilizing measured values received from the control unit in comparison with an expected measured value; e) retrieving status information, including error information, of the control unit; f) actuating a pump current controller of the control unit after receiving a new measured value of a Nernst voltage; g) setting switches of the control unit in such a way that at least one of no short circuits or current interruptions occur; h) starting measurements using an analog-to-digital converter synchronously with a reference signal or reference clock; i) resetting an input filter of the analog-to-digital converter; j) transferring data at least one of from the control unit to the processing device or from the processing device to the control unit, via a serial data interface; k) generating an item of control information which signals a conclusion of a measurement; l) generating error information.

2. The method as recited in claim 1, wherein the exhaust gas probe is a broadband Lambda probe, and the internal combustion engine is of a motor vehicle.

3. The method as recited in claim 1, wherein the processing device at least partially realizes a primary sequence control for an operation of the exhaust gas probe, and a secondary sequence control of the control unit is controlled using the primary sequence control.

4. A processing device for operating a control unit for an exhaust gas probe for an internal combustion engine, the control unit being configured to electrically actuate the exhaust gas probe, and the control unit being implemented as an application-specific integrated circuit (ASIC), the processing device being configured to:

specify control data for an operation of at least one of the control unit or the exhaust gas probe; and receive operating data characterizing the operation of at least one of the control unit or the exhaust gas probe, wherein the processing device has an analog-to-digital converter and at least intermittently digitizes at least one of at least one analog signal of the exhaust gas probe or an analog signal derived from the analog signal of the exhaust gas probe, using the control unit wherein the digitized signal is used for controlling the operation of the at least one of the control unit or the exhaust gas probe using the processing device, wherein the processing device has at least one processing unit configured to execute at least one computer program which is configured to at least one of control the operation of the at least one of control unit or the exhaust gas probe, or to generate the control data, or to receive the operating data at least intermittently, wherein the processing device at least partially realizes a sequence control for an operation of the exhaust gas probe, the sequence control being at least partially predefined using at least one computer program, wherein the sequence control control(s) all of the following sequences at least intermittently: a) establishing time intervals of measurements; b) transmitting setpoint values for switch settings to the control unit; c) transmitting measured values ascertainable using the control unit, to the processing device; d) at least one of identifying or plausibilizing measured values received from the control unit in comparison with an expected measured value; e) retrieving status information, including error information, of the control unit; f) actuating a pump current controller of the control unit after receiving a new measured value of a Nernst voltage; g) setting switches of the control unit in such a way that at least one of no short circuits or current interruptions occur; h) starting measurements using an analog-to-digital converter synchronously with a reference signal or reference clock; i) resetting an input filter of the analog-to-digital converter; j) transferring data at least one of from the control unit to the processing device or from the processing device to the control unit, via a serial data interface; k) generating an item of control information which signals a conclusion of a measurement; l) generating error information.

5. A non-transitory computer-readable memory medium on which are stored instructions for operating a control unit for an exhaust gas probe for an internal combustion engine, the control unit being configured to electrically actuate the exhaust gas probe, and the control unit being implemented as an application-specific integrated circuit (ASIC), the instructions, when executed by a computer, causing the computer to perform:

specifying control data for an operation of at least one of the control unit or the exhaust gas probe using a processing device; and receiving operating data characterizing the operation of at least one of the control unit or the exhaust gas probe using the processing device, wherein the processing device has an analog-to-digital converter and at least intermittently digitizes at least one of at least one analog signal of the exhaust gas probe or an analog signal derived from the analog signal of the exhaust gas probe, using the control unit wherein the digitized signal is used for controlling the operation of the at least one of the control unit or the exhaust gas probe using the processing device, wherein the processing device has at least one processing unit configured to execute at least one computer program which is configured to at least one of control the operation of the at least one of control unit or the exhaust gas probe, or to generate the control data, or to receive the operating data at least intermittently, wherein the processing device at least partially realizes a sequence control for an operation of the exhaust gas probe, the sequence control being at least partially predefined using at least one computer program, wherein the sequence control control(s) all of the following sequences at least intermittently: a) establishing time intervals of measurements; b) transmitting setpoint values for switch settings to the control unit; c) transmitting measured values ascertainable using the control unit, to the processing device; d) at least one of identifying or plausibilizing measured values received from the control unit in comparison with an expected measured value; e) retrieving status information, including error information, of the control unit; f) actuating a pump current controller of the control unit after receiving a new measured value of a Nernst voltage; g) setting switches of the control unit in such a way that at least one of no short circuits or current interruptions occur; h) starting measurements using an analog-to-digital converter synchronously with a reference signal or reference clock; i) resetting an input filter of the analog-to-digital converter; j) transferring data at least one of from the control unit to the processing device or from the processing device to the control unit, via a serial data interface; k) generating an item of control information which signals a conclusion of a measurement; l) generating error information.

6. A control unit for an exhaust gas probe for an internal combustion engine, the control unit configured to electrically actuate the exhaust gas probe, the control unit being implemented as an application-specific integrated circuit (ASIC), the control unit being configured to:

receive from a processing device control data for an operation of at least one of the control unit or the exhaust gas probe;

transmit operating data which characterizes the operation of at least one of the control unit or the exhaust gas probe to the processing device, wherein the processing device has an analog-to-digital converter and at least intermittently digitizes at least one of at least one analog signal of the exhaust gas probe or an analog signal derived from the analog signal of the exhaust gas probe, using the control unit wherein the digitized signal is used for controlling the operation of the at least one of the control unit or the exhaust gas probe using the processing device, wherein the processing device has at least one processing unit configured to execute at least one computer program which is configured to at least one of control the operation of the at least one of control unit or the exhaust gas probe, or to generate the control data, or to receive the operating data at least intermittently, wherein the processing device at least partially realizes a sequence control for an operation of the exhaust gas probe, the sequence control being at least partially predefined using at least one computer program, wherein the sequence control control(s) all of the following sequences at least intermittently: a) establishing time intervals of measurements; b) transmitting set-point values for switch settings to the control unit; c) transmitting measured values ascertainable using the control unit, to the processing device; d) at least one of identifying or plausibilizing measured values received from the control unit in comparison with an expected measured value; e) retrieving status information, including error information, of the control unit; f) actuating a pump current controller of the control unit after receiving a new measured value of a Nernst voltage; g) setting switches of the control unit in such a way that at least one of no short circuits or current interruptions occur; h) starting measurements using an analog-to-digital converter synchronously with a reference signal or reference clock; i) resetting an input filter of the analog-to-digital converter; j) transferring data at least one of from the control unit to the processing device or from the processing device to the control unit, via a serial data interface; k) generating an item of control information which signals a conclusion of a measurement; l) generating error information.

7. The control unit as recited in claim 6, wherein the processing device is configured to specify the control data for the operation of at least one of the control unit or the exhaust gas, and receive the operating data characterizing the operation of at least one of the control unit or the exhaust gas probe.

8. The control unit as recited in claim 6, wherein the exhaust gas probe is a broadband Lambda probe, and the internal combustion engine is for a motor vehicle.

9. The control unit as recited in claim 6, wherein the control unit at least partially realizes a sequence control for an operation of the exhaust gas probe, and the sequence control of the control unit at least intermittently controls at least one of the following sequences:

setting switches of the control unit in such a way that at least one of no short circuits or current interruptions occur;

starting measurements using an analog-to-digital converter integrated into the control unit synchronously with a reference signal or reference clock;

resetting an input filter of the analog-to-digital converter;

transferring data at least one of from the control unit to the processing device or from the processing device to the control unit, via a serial data interface;

generating an item of operating information which signals a conclusion of a measurement;

generating error information.

* * * * *